Sept. 23, 1958     D. D. DONOHOO     2,852,984
THREE DIMENSIONAL CUTTER AND FOLLOWER MACHINE
Filed May 18, 1955     2 Sheets-Sheet 1

INVENTOR.
DAVID D. DONOHOO
BY Toulmin & Toulmin
ATTORNEYS

Sept. 23, 1958    D. D. DONOHOO    2,852,984
THREE DIMENSIONAL CUTTER AND FOLLOWER MACHINE
Filed May 18, 1955    2 Sheets-Sheet 2
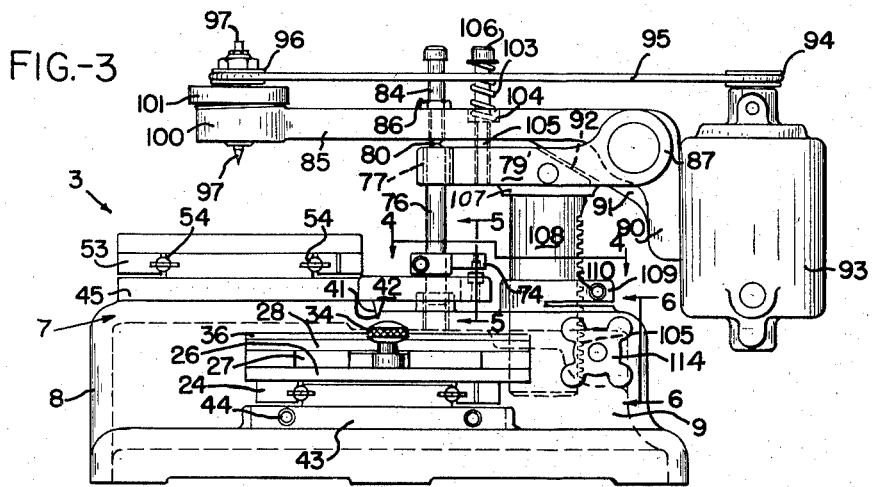
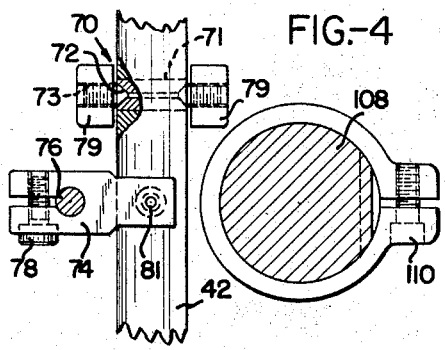
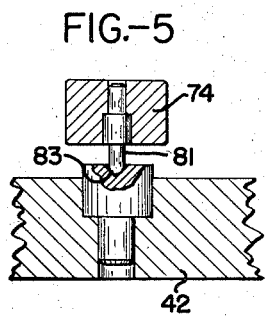
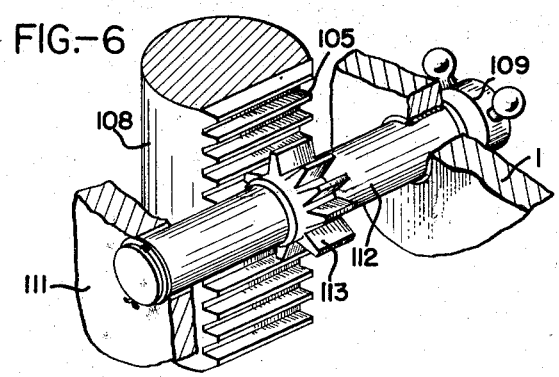
*INVENTOR.*
DAVID D. DONOHOO
BY *Toulmin & Toulmin*
ATTORNEYS United States Patent Office 2,852,984
Patented Sept. 23, 1958

2,852,984
THREE DIMENSIONAL CUTTER AND FOLLOWER MACHINE

David D. Donohoo, Centerville, Ohio

Application May 18, 1955, Serial No. 509,160

7 Claims. (Cl. 90—13.1)

The present invention relates to machines by which patterns can be duplicated or simulated, more especially in three dimensions, and to any practical scale.

In the art of making metal articles of complicated shape and design, it is usual to provide a wooden or metal pattern from which a casting can be molded. The pattern must be of a finished form and lend itself to the molding process. It is therefore expensive to make and this expense is reflected in the molded product.

When tools are to be reproduced, it is practically necessary that each tool be hand or machine worked, made to order which, again, necessitates a finished product of considerable expense.

Furthermore, in the standard reproduction processes in the engraving art where line contours are to be followed and reproduced in various sizes, the tracing points or tool is caused to move sidewise in the horizontal plane to follow the pattern or device, such as a tool to be reproduced, and the latter remains stationary.

While a machine of this sort is fairly satisfactory, it has definite limitations as to the accuracy with which the pattern can be followed. The starting and stopping points of the tracer on the surface of the pattern or master tool is often difficult to determine and duplicate, particularly in the case of small patterns. Moreover, most machines of this character can be used for only small successive movements of the tracer so that their range of usefulness in duplicating patterns or contours is extremely limited.

The primary object of the invention is to provide a machine for duplicating structures or patterns, and in which greater accuracy can be obtained than in the case of conventional machines.

Another object is to provide a pattern-follower or duplicating machine in which wide variations of size and countour can be accommodated, either in the horizonal or vertical directions.

Another object is to provide a duplicating machine in which the pattern, as a whole, can be made of any size or material, or of any shape, and strict conformancy as to size or shape and on any proportional scale.

The objects are attained, in brief, by providing a three-dimensional machine in which the tracer point remains stationary in the horizontal plane, but the pattern is caused to move. The lateral movements of the pattern or master model are carried through a pantograph mechanism to the workpiece. The tracer point is permitted to move in the vertical direction and these movements are carried through a lever system, with or without amplification, into corresponding movements of the cutting tool.

Thus, the tracer point moves only in one direction, namely vertical, and the pattern moves only in the horizontal direction, but universally in any direction in the horizontal plane. This separation of the movement functions is highly desirable in extending the usefulness of the machine.

Other objects and features will be apparent as the specification is perused in connection with the accompanying drawings, in which:

Figure 3 represents an end elevational view of the machine;

Figure 4 is a sectional view taken along line 4—4 in Figure 3 and looking in the direction of the arrows;

Figure 5 is a vertical fragmentary section taken along 5—5 in Figure 3, as indicated by the arrows; while Figure 6 represents a perspective view of the vertical adjustment mechanism of the cutting tool arm; this view, which is partly in section, is taken at about the position of line 6—6 in Figure 3.

The views shown in Figures 4, 5 and 6 are somewhat enlarged for clearness over the views obtained in the various sectional lines in Figure 3.

Figure 1:
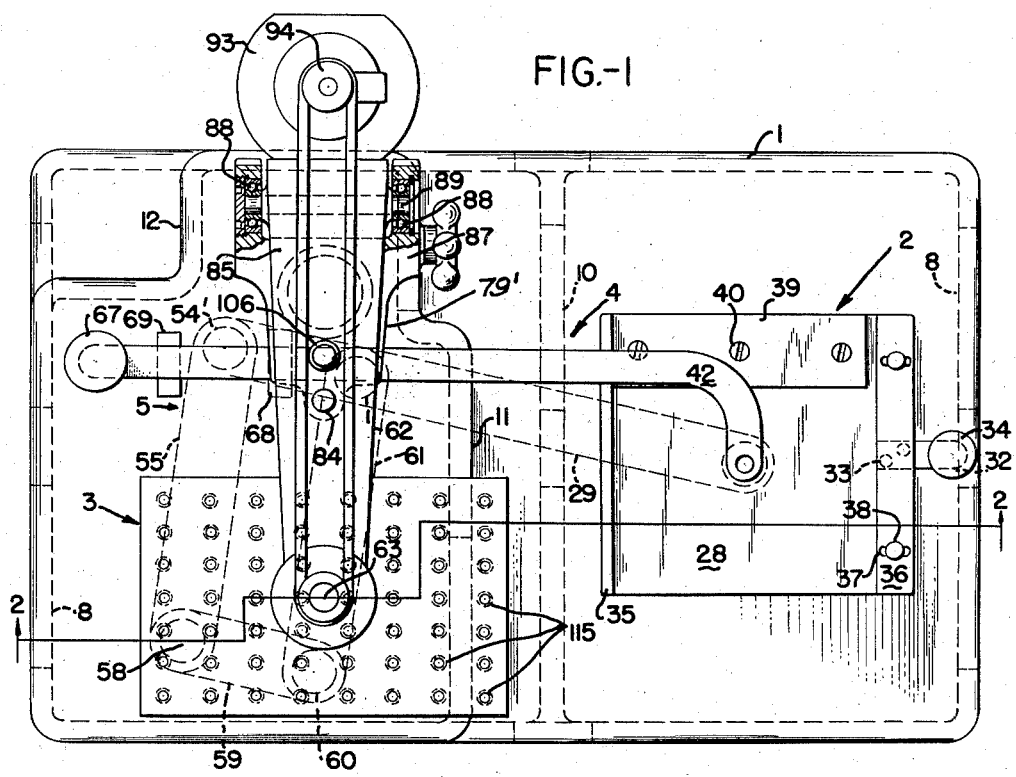
Figure 1 is a plan view of the machine but with one of the bearings at the working tool position being shown in section.
Figure 2:
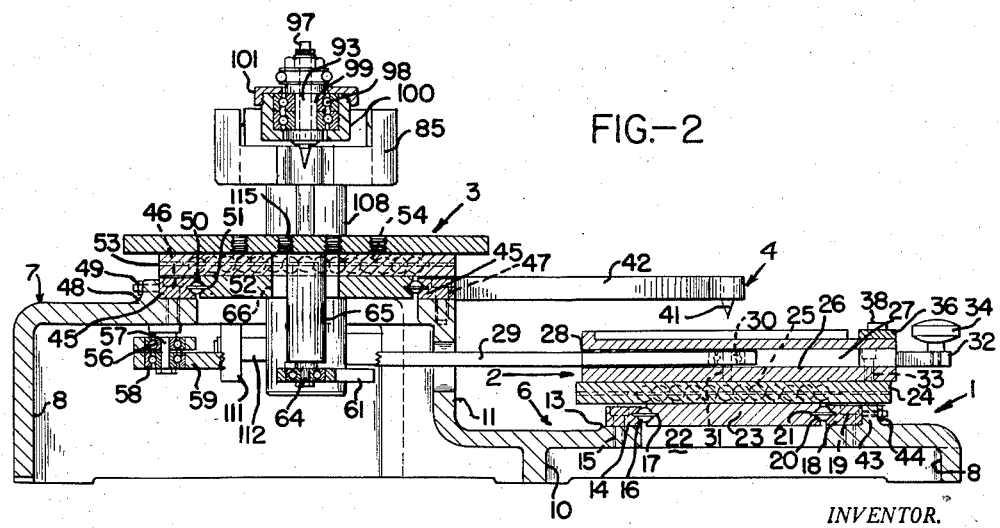
Figure 2 is a side sectional view of the machine and in which the section is taken at approximately along the line 2—2 in Figure 1.

Referring more particularly to Figs. 1 and 2, the duplicating machine comprises the following main parts which will be described separately and are indicated by general reference characters:

The frame casting is indicated at 1; the lower level portion or pattern platform at 2; the upper level portion or work platform at 3; the tracing point mechanism at 4; and a multiplying or pantograph system at 5.

The machine, as a whole, operates on the principle of moving the pattern beneath a tracing point or feeler which is adapted to move only in the vertical direction and to translate this movement into corresponding movements of the cutting tool. The pattern, or rather the platform which carries the pattern, is also adapted to move universally in the horizontal plane directly under the tracing point, and transfer these movements with or without multiplication to similar movements of the workpiece, or rather, the platform carrying the workpiece directly under the cutting tool.

Consequently, the pattern is caused to be felt or examined by the tracing point in three dimensions, i. e. lengthwise, widthwise and in height, and the cutting point or tool is caused accurately to cut the contour and shape of the pattern into the workpiece, in each of these three dimensions.

*Frame casting*

All of the elements are mounted on a hollow frame 1 of rectangular configuration, and having a low level portion at 6 and a high level portion at 7. The sides of the frame are constituted of straight, downwardly extending flanges 8 to provide rigidity and having a curvilinear flange 9 at the rear to accommodate the adjustment handle. A rib 10 may extend laterally across the frame for strengthening purposes. The high and low level portions of the frame are separated by a wall 11 extending laterally and, if desired, a reentrant portion 12 may be provided at one corner of the frame near the high level end.

*Pattern platform*

The frame 1 at the low level portion is provided with a bossed surface 13 on which rests a hardened steel guide bar 14. This bar is bolted, as indicated at 15, to the surface 13 and has along its inner surface a V-shaped notch grooved at the bottom to receive ball bearings 16 contained in a retaining strip 17.

At the other side of the low level portion, a hardened steel guide bar 18 also rests on the frame and is bolted at 19. However, in this case, some looseness is permitted between the screw and the opening in the bar in order to accommodate an adjustment of the bar, as will be explained hereinafter. The bar 18 has a V-notch extending along its entire inner surface with a slot at the bottom to receive ball bearings 20 contained in a retaining strip 21. The base 1 may be provided with an opening indicated at 22, of a length equivalent to the length of the guide bars 14, 18 and of a width determined by the distance between the inner surface of these bars.

There is a plate 23 located between the ball bearings 16, 20 and having V-notches along its side edges and also a slot at the bottom to accommodate the remaining half of the ball bearings and the retaining strip. Thus the plate 23 is adapted to move laterally of the frame, i. e. in and out of the plane of the paper.

Secured to the top of the plate 23 in any suitable manner, there is a pair of spaced guide bars 24 but extending in a direction at right angles to the guide bars 14, 18, these guide bars having V-notches and slots to receive ball bearings 25. A plate (not shown) is located between the guide bars 24, similar to the plate 23, but extending longitudinally of the base, this plate having V-notches and slots to receive the inner portions of the ball bearings 25 and their retaining plates.

Thus, this last mentioned plate is adapted to move lengthwise of the base because it is carried on the ball bearings 25 and is also adapted to move in the lateral direction because it is carried on the plate 23 which, in turn, moves laterally on the balls 16, 20 and obviously this plate can move in any composite direction. Thus, the plate has universal movement in the horizontal plane.

Secured to the plate contained between the bars 24 there is a plate 26 and directly above there is a second pair of spaced bars 27 secured in any suitable manner to the plate 26. A plate 28 of rectangular configuration rests on the bars 27 and is secured thereto so as to leave a rectangular space under the plate for loosely accommodating an arm 29. This arm which forms part of a pantograph lever system, which will be described presently, terminates in a ball bearing member, indicated generally at 30, contained in the space between the lower surface of the plate 28 and the upper surface of the plate 26, the shaft 31 for the bearing being driven or otherwise secured in the plate 26. Thus, the arm 29 is adapted to swing on its bearing 30 within the slot-like compartment formed between the plates 28, 26.

A metal arm 32 projects rearwardly from the space between the bars 27 and is screwed to the plate 26 as indicated at 33. The hand knob 34 is attached to the outer end of this bar and its purpose is to move the entire system of plate 28, bars 27, plate 26, and the plate contained between the guide bars 24, in any horizontal direction by reason of the ball bearings 25, 16, as explained hereinbefore. The plate 28 is provided along its inner end with an upstanding flange 35, also a bar 36 with slotted openings 37, the bar being secured to the plate 28 by means of screws 38, the shanks of which pass through the slots 37.

Thus, the bar 36 is adapted to be adjusted in the direction of the slots and thus move the pattern or sample which rests on the plate 28 in a corresponding manner when and if the pattern abuts the bar 36. Along one side edge of the plate 28 there is another bar 39 at right angles to the flange 35 and the bar 36, and this bar 39 is screwed to the plate 28, as indicated at 40.

A tracer point or feeler 41, carried by an arm 42, is suspended over the plate 28, this tracer point being adapted to move only in the vertical direction, as will also be explained hereinafter. Thus, any pattern, model, or engraving contour that it is desired to duplicate can be placed on the platform 28 directly under the feeler 41 and, by manipulating the knob 34, all parts of the pattern or contoured member is felt by the tracer point 41. In doing this, the latter is caused to move upwardly or downwardly, depending on the various heights of the contours and, in addition, the plate 28 is caused to move in various directions in the horizontal plane.

In order to prevent over-run of the moving platform 28 and to apply a certain amount of friction, pressure may be applied to the guide bars 24, 18 to cause a slight pinching of the movable plate which is carried on the two sets of ball bearings. One such adjustment is shown in Fig. 2 in which the base is provided with a ridge 43 which has one or more screws 44 passing through it and these screws abut the outer surfaces of one guide bar of each set. Thus, by tightening the screws 44, the guide bar 18 is forced slightly to the left because the bolts 19 are loosely fitted and this inward pressure is exerted through the ball bearings 20 onto the plate 23 to provide slight friction at the rolling surfaces.

Upper level platform

The platform indicated at 3 is for the purpose of carrying the workpiece or tool to be duplicated either to the same or to a different size from the original which is located on the plate 28. The base 1 at the left-hand end of Figs. 1 and 2, is provided with a pair of guide bars 45, bolted or otherwise secured as indicated at 46, 47, to the base. The opening in the guide bar for the bolt 46 is slightly larger than the bolt in order to allow adjustment to the left-hand guide bar. This adjustment may be provided by a ridge 48 extending upwardly from the base and through which one or more screws 49 project which bear against the left-hand guide bar. Thus, by tightening the screws 49, this guide bar can be caused to move slightly to the right, notwithstanding the presence of the bolts 46.

The guide bars 45 have V-shaped notches with slots, similar to those described in connection with guide bars 14, 18, for carrying ball bearings 50 contained within retainer strips 51. A plate 52 with corresponding V-shaped notches and a slot at the bottom is suspended on the ball bearings 50 and, as shown in Fig. 2, is therefore adapted to move into and out of the plane of the paper.

Attached to the plate 52 there is a pair of spaced guide bars 53 having V-notches and slots along the inner edges (not shown) for receiving ball bearings 54. A plate is suspended between these two sets of ball bearings, this plate having corresponding V-notches and slots to receive the ball bearings and their retaining strips. A work-table or platform 3 is secured to this plate and it is obvious that the arrangement is such that the platform 3 can move in the lateral direction, i. e. into and out of the plane of the paper on account of the ball bearings 50, and can move longitudinally of the base on account of the ball bearings 54. Thus, the platform can be moved universally in the horizontal plane, i. e. in all directions.

The mechanism which is about to be described is for the purpose of co-relating the movements of the working tool platform 3 to the pattern or contour device platform indicated at 2.

Pantograph system

This mechanism, as generally indicated at 5, is comprised of a series of links pivoted together, of which one link 29 has been referred to hereinbefore. One end of the arm 29 is carried on the ball bearing 30, and at the other end there is a ball bearing, not shown in detail but indicated at 54', which is supported on a shaft (not shown) secured to the underside of the base at the high platform end. A link arm 55 is also provided with a ball bearing at the position 54' on the same shaft as the bearing of the arm 29, and at its other end, the arm is carried on a ball bearing 56 mounted on a shaft 57.

This shaft has a second ball bearing 58 carrying a link arm 59 which terminates at a ball bearing indicated at 60. The shaft for the last mentioned ball bearing has a second ball bearing (not shown) which carries a link arm 61 that passes under the arm 29 and terminates in a ball bearing indicated at 62, the shaft of which is secured to the arm 29. Thus, at each of the positions 62, 54', 58 and 60 there are ball bearings similar to the type described in connection with the shaft 57 and the bearings 56, 58, so that any movement of the arm 29 by reason of a shift in position of the platform 2 will cause corresponding movements of the arms 29, 55, 59 and 61 about their respective bearings.

The connection between the pantograph mechanism and the plate 3 is made at the arm 61. This arm, at the position 63 (Fig. 1), contains a ball bearing through which projects a shaft 64 and this shaft is carried on a stud 65 which passes through a large opening 66 in the plate 52 and is attached to the plate 3. Consequently, any movement of the plate 2 in any one of the horizontal directions, or any combination of directions, is transferred accurately in any and all such directions to the plate 3 on which the workpiece is located.

*The elevating mechanisms for the tracer point and corresponding movements of the working tool*

This mechanism is indicated generally at 4. When the pattern shows recesses or projections, contours of different heights, it becomes necessary to be able to raise or lower the tracing point or feeler so as to follow the recesses, projections or other contours and to transfer these vertical movements of the tracing point or feeler to corresponding movements in the vertical direction of the cutting tool. It may also be desirable to provide any multiplying factor of these vertical movements so that they can either be increased or decreased in accordance with any increase or decrease of the relative movements between the plates 2 and 3 brought about by a particular pantograph system including length of levers, etc.

The feeler or tracer point 41 is carried on a bent arm 42 which extends lengthwise of the base and is pivoted at a position intermediate of its length, the end opposite from the tracing element being provided with a balancing weight 67, as seen in Fig. 1.

At one or more intermediate positions indicated at 68, 69, two pivots are provided, of which only one pivot is operative at any one time to give any desired amplifying factor to the movements of the arm 42 with respect to the final movements of the cutting tool in the vertical direction. These pivot points are indicated generally at 70 in Fig. 4 and comprise, at each of the positions 68, 69, a plug 71 of case-hardened steel passing through the edge of the arm, with a V-shaped countersunk opening 72 at the ends of each plug for receiving a set screw 73 which is contained in a lug 79 secured to the upper surface of the base at the high level position. It will be understood that there are two pairs of upstanding lugs 79, one pair at each position 68, 69, with one lug of each pair positioned on each side of arm 42.

It is apparent that if it were desired to swing the arm 42 about the position 68 as a pivot, it is merely necessary to turn the screws 73 into the countersunk openings to form pivot pins about which the arm can rock. If the multiplying factor is such that the position 69 is desired as the pivot point, the screws 73 are withdrawn from the pivot position 68 and corresponding screws are caused to press inwardly against the countersunk openings in the arm at the position 69. Any number of these pivot bearings may be provided along the arm 42 to allow any desired relative movement between the motions of the tracer point and the forming tool. If desired, a single but slidable pivot mechanism, adjustable within a groove (not shown), may also be employed in place of the two or more separately used pivots.

There is a metal lug 74 extending away from the arm 42 but positioned above the arm, as seen in Fig. 5. This lug has an opening for receiving a rod 76 with a slot leading to the opening in order that a bolt 78, passing between the legs of the strip, can serve to tighten the rod within the strip. The rod 76 extends upwardly and passes through a bushed opening 77 in a yoked member 79' which is normally stationary. The rod projects slightly above the member as indicated at 80.

A support member is provided between the lug 74 and the arm 42 so that as the arm is raised or lowered while the tracer point is feeling the pattern, the rod 76 is given a corresponding movement in the vertical direction. This support member is shown in Fig. 5 and comprises a case-hardened pin 81 driven or screwed into the lug 74. A case-hardened plug 82 is driven or screwed into the arm 42 directly below the pin. The plug has a V-shaped recess 83 in which the pin sets. Thus, as the arm 42 moves upwardly, the lug is caused to raise and carry the rod 76 with it.

Directly above the projecting portion 80 of the rod 76 there is a rod 84 which extend downwardly and is secured to a heavy bar 85 This rod may be threaded and held at the proper distance, i. e. so that the lower end will contact the projecting end 80, by means of a nut 86. The member 79' terminates in a U-shaped or yoke portion 87, of which the legs are provided with ball bearings 88.

The bar 85 increases in width toward the bearing position, as seen in Fig. 1, to form a wedge-shaped member and is provided with bearing pins 89 which are carried on the ball bearings 88 of the end portion 87 of the yoke member. The bar 85 is provided with a downwardly extending portion 90 beyond the bearings and a reinforcing rib 91 extends diagonally upward from the portion 90 to the main portion 85 of the bar.

In order to provide the necessary clearance for the rib where it extends between the legs of the yoke member a portion of the member is beveled at 92 so as to clear the rib when the bar 85 is in a horizontal position. The beveled surface at 92 and the rib 91 prevents the arm 85 from falling below the horizontal position. A motor 93 can be attached to the bar portion 90, the motor being provided with a pulley 94.

A belt 95 extends about a pulley 96 to drive the cutting tool 97. This tool, as seen in Fig. 2, is carried on a ball bearing 98 through a bushing 99. The tool itself is constituted of a rod 97 which may be pressed or screwed into the bushing and is beveled and fluted to a cutting point at the working end. The ball bearings are contained in a cup 100 having a screw-threaded cap 101, this cup forming the terminal portion of the bar 85.

Thus, as the motor 93 is energized, the belt 95 drives the working or cutting tool 97 and the latter is caused to move upwardly or downwardly by the presence of the swinging action of the bar 85 at the pins 89 in response to corresponding vertical movements of the rod 76 which, in turn, responds to the vertical motion of the arm 42.

In order to assure a gentle pressure being exercised downwardly on the bar 85 and thereby provide greater accuracy with which this bar follows the movements of the arm 42, I may provide a compression spring 103 which is set in a countersunk depression 104 in the bar 85 and is held in place by means of a bolt 105 which is threaded into the yoke member 79'. There is an opening in the bar 85 which loosely receives the shank of the bolt so that when the bar is caused to move upwardly at the urge of the rod 76, the spring 103 is compressed against the head 106 of the bolt which exercises a continuous downward pressure on the bar.

When a workpiece is placed on the platform 3 and is of greater than normal height so that the machine is set for amplification of the movement at the tracing point, it may be found that the cutting tool 97 is so close to the platform that the workpiece cannot be accommodated. It is therefore necessary temporarily to raise the cutting tool, and that is accomplished in the manner which will now be described.

The yoke member 79' is provided with a downwardly extending circular boss 107 at that position which does not form part of the yoke portion and there is a circular support 108 secured to the boss 107, this support extending through an opening in the top of the base member, as shown in Fig. 3. It is held in position with respect to the base member by means of a clamp collar 109, split at its periphery. There is a screw 110 which serves to clamp the support at any position with respect to the base member. This collar 109 may be secured to the base-member as shown in Fig. 3. The support 108 is provided with teeth 105, similar to a rack, as seen more readily in Fig. 6.

The base member 1 is provided with a downwardly extending integral web 111 and there is a pair of aligned openings in this web member and in the outer end portion of the base. A shaft 112 extends through this opening carrying a pinion 113. A hand wheel 114 is keyed to the shaft. Thus, by loosening the screws 110 and 78, the entire upper structure of the machine, including the motor, can be raised as a body by turning the wheel 114.

It will be noted that the rod 76 projects for a distance through an opening in the base member so that if the support 108 is raised at the rack, the rod 76 will also slide with respect to the lug 74 and that portion of the rod which is contained within the base member now serves as an additional length of rod. When the working tool 97 has been moved upwardly the proper distance to clear the workpiece, the screws 110, 78 are then tightened. It is apparent that the support 108 serves to carry the entire weight of the motor, the bar 85 and the yoke member 79', so that little or no support in the vertical direction is taken by the rod 76 whose function solely is to temporarily raise and lower the bar 86 in sympathy with the up and down movements of the arm 42.

In order securely to fasten the workpiece to the table 3, the latter may be provided with a number of equally spaced tapped openings 115 to receive clamping bolts so that the table can accommodate any practical size of workpiece and held securely in position while work is being performed at the tool 97. It is obvious that this tool which may be constituted of carboloy steel, can be replaced from time to time by simply removing the rod 97 and replacing it with a new rod having a new tool end.

From the foregoing, it is evident that I have disclosed a machine in which the horizontal movements of the pattern or contour device which might be of metal, wood, plaster of Paris or plastic, are duplicated in any desired proportion or size depending on the lengths and relative positions of the arms 55, 59 and 61 of the pantograph 5.

As this workpiece is moved under the tool 97 which is stationary in the horizontal plane, the tool will cut the same horizontal outline as the pattern. In addition, the tool is given a vertical movement in any ratio desired with respect to the movement of the forming tool, depending on the position of the pivot members 68, 69, so that the machine as a whole causes the tool to cut the workpiece in the same or corresponding duplication of the pattern in both the vertical and horizontal directions.

Steel engravings can readily and accurately be made in a machine of this sort because the size of the plate 2 and the movements of the plate in the horizontal direction can be accurately gauged with respect to the tracer point 41 and this accuracy is reflected in the corresponding movements of the work plate 3. The starting and stopping points in the movement of the platform or plate 2 about the tracer point can also be readily and accurately controlled. This is of particular advantage where an engraving is large and complicated in design which would require some discontinuity of operation.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desired to secure by Letters Patent, is:

1. A machine for copying patterns, comprising a pattern platform adapted to receive the pattern, a work platform adapted to receive the workpiece which is to be worked to the shape of the pattern, means for supporting said platforms for separate movement, said platforms being movable only in the horizontal direction, a tracer point stationary in the horizontal direction but movable in the vertical direction positioned over the pattern platform, a forming tool stationary in the horizontal direction but movable in the vertical direction positioned over the work platform, means including a lever connection between said platforms for constraining the work platform to move in the same horizontal direction as the movement of the pattern platform when the latter is moved to bring all parts of the surface of the pattern successively under the tracer point, means including a lever connection for causing the forming tool to move in the vertical direction only in accordance with vertical movements given to the tracer point by the pattern as the latter is moved under the tracer point, whereby the vertical and horizontal contours of the pattern are copied as corresponding vertical and horizontal contours of the workpiece by the vertical movements of the forming tool and tracer point and the horizontal movements of the work and pattern platforms so that the shape of the pattern is copied into the shape of the workpiece in three dimensions by the combined use of the horizontally movable platforms and the vertical movable forming tool and tracer point.

2. A machine for copying patterns, comprising a pattern platform adapted to receive the pattern, a work platform adapted to receive the workpiece which is to be worked to the shape of the pattern, means for supporting said platforms for separate movement, said platforms being movable only in the horizontal direction; a tracer point stationary in the horizontal direction but movable in the vertical direction and positioned over the pattern platform, said tracer point being carried by a pivoted lever, a lifting rod on said lever, a forming tool stationary in the horizontal direction but movable in the vertical direction positioned over the work platform, means including a lever connection between said platforms for constraining the work platform to move in the same horizontal direction as the movement of the pattern platform when the latter is moved to bring all parts of the surface of the pattern successively under the tracer point, and means including a pivoted lever operated through said lifting rod for moving the tracer point and forming tool in synchronism with one another in the vertical direction.

3. A machine for copying patterns, comprising a pattern platform adapted to receive the pattern, a work platform adapted to receive the workpiece which is to be worked to the shape of the pattern, means for supporting said platforms for separate movement, said platforms being movable only in the horizontal direction, a tracer point stationary in the horizontal direction but movable in the vertical direction positioned over the pattern platform, said tracing point being carried on a pivoted lever, a lifting rod on said lever, a forming tool stationary in the horizontal direction but movable in the vertical direction positioned over the work platform, means including a lever connection between said platforms for constraining the work platform to move in the same horizontal direction as the movement of the pattern platform when the latter is moved to bring all parts of the surface of the pattern successively under the tracing point, and means including a pivoted lever operated through said lifting rod for moving the tracer point and forming tool in synchronism with one another in a vertical direction, the pivot of said first mentioned lever being adjustable along the length thereof to provide any desired proportional movement of the forming tool with respect to the vertical movement of the tracer point.

4. A machine for copying patterns, comprising a pattern platform adapted to receive the pattern, a work platform to receive the workpiece which is to be worked to the shape of the pattern, means for supporting said platforms for separate movement, said platforms being movable only in the horizontal direction, a tracer point stationary in the horizontal direction but movable in the vertical direction positioned over the pattern platform, a forming tool stationary in the horizontal direction but movable in the vertical direction positioned over the work platform, means including a lever connection between said platforms for constraining the work platform to move in the same horizontal direction as the movement of the pattern platform when the latter is moved to bring all parts of the surface of the pattern successively under the tracer point, means including a lever connection for causing the forming tool to move in the vertical direction only in accordance with the vertical movements given to the tracer point by the pattern as the latter is moved under the tracer point, means for adjusting and controlling vertical movements of the forming tool in relation to the vertical movements of the tracing point as the pattern is moved to bring all parts thereof under the tracer point.

5. A machine for copying patterns, comprising a pattern platform adapted to receive the pattern, a work platform to receive the workpiece which is to be worked to the shape of the pattern, means for supporting said platforms for separate movement, said platforms being movable only in the horizontal direction, a tracer point stationary in the horizontal direction but movable in the vertical direction positioned over the pattern platform, a forming tool stationary in the horizontal direction but movable in the vertical direction positioned over the work platform, means including a lever connection between said platforms for constraining the work platform to move in the same horizontal direction as the movement of the pattern platform when the latter is moved to bring all parts of the surface of the pattern successively under the tracer point, means including a lever connection for causing the forming tool to move in the vertical direction only in accordance with the vertical movements given to the tracer point by the pattern as the latter is moved under the tracer point, means for adjusting and controlling vertical movements of the forming tool in relation to the vertical movements of the tracing point as the pattern is moved to bring all parts thereof under the tracer point, said last mentioned means including a pivoted lever which carries the tracing point and is mechanically connected to the forming tool, the pivot of said pivoted lever being adjustable along the length of the lever in order to regulate the amount of movement of the forming tool in response to the vertical movements of the tracer point as the pattern and its platform are moved under the tracer point.

6. A machine for copying patterns, comprising a pattern platform adapted to receive the pattern, a work platform adapted to receive the workpiece which is to be worked to the shape of the pattern, means for supporting said platforms for separate movement, said platforms being movable only in the horizontal direction, a tracer point stationary in the horizontal direction but movable in the vertical direction positioned over the pattern platform, a forming tool stationary in the horizontal direction but movable in the vertical direction positioned over the work platform, said tracer point being carried on a pivoted lever and said forming tool being carried on a separate pivoted lever, and means for controlling the relative motion between said pivoted levers in response to the vertical movements of the tracer point when the pattern and its platform are moved under the tracer point whereby the movement of the forming tool is correspondingly controlled, means including a lever connected between said platforms for constraining the work platform to move in the same horizontal direction as the movement of the pattern platform when the latter is moved to bring all parts of the surface of the pattern successively under the tracer point, and means for adjusting the position of the pivot along the pivoted lever which carries the tracer point whereby the distances through which the lever that carries the forming tool moves when actuated by the vertical movements of the tracer point are controlled.

7. A machine for copying patterns, comprising a pattern platform adapted to receive the pattern, a work platform adapted to receive the workpiece which is to be worked to the shape of the pattern, each of said platforms being mounted for movements in all directions in a horizontal plane, but in different planes, said means including two sets of ball bearings for each platform, a tracer point stationary in the horizontal direction but movable in the vertical direction positioned over the pattern platform, a forming tool stationary in the horizontal direction but movable in the vertical direction positioned over the work platform, means including a pantograph connected between the platforms for constraining the work platform to move in the same horizontal direction as the movement of the pattern platform notwithstanding the different planar position of the two platforms when the pattern platform is moved to bring all parts of the surface of the pattern successively under the tracer point, means including a lever connection for causing the forming tool to move in the vertical direction only in accordance with the vertical movements given to the tracer point by the pattern as the latter is moved under the tracer point, whereby the vertical and horizontal contours of the pattern are copied as corresponding vertical and horizontal contours of the workpiece by the vertical movements of the tool and tracer point and the horizontal movements of the work and pattern platforms, and means for adjusting the average height of the forming tool above the work platform, above and below which height the forming tool is caused to move in response to the vertical movement of the tracer point.

References Cited in the file of this patent

UNITED STATES PATENTS

| | | |
|---|---|---|
| 1,313,543 | Keller | Aug. 19, 1919 |
| 1,669,900 | Keller | May 15, 1928 |
| 2,005,696 | Gorton et al. | June 18, 1935 |
| 2,488,088 | Marchant et al. | Nov. 15, 1949 |
| 2,651,889 | Hannum | Sept. 15, 1953 |